United States Patent [19]

Yasuhara et al.

[11] 4,128,878

[45] Dec. 5, 1978

[54] SYSTEM FOR EXCUTING A PROGRAM-CALL INSTRUCTION IN A COMPUTER

[75] Inventors: Hiroshi Yasuhara; Seiki Saito, both of Tokyo, Japan

[73] Assignee: Oki Electric Industry, Co., Ltd., Tokyo, Japan

[21] Appl. No.: 814,333

[22] Filed: Jul. 11, 1977

[30] Foreign Application Priority Data

Jul. 20, 1976 [JP] Japan .................................. 51-85612

[51] Int. Cl.² .............................................. G06F 9/00
[52] U.S. Cl. ..................................................... 364/200
[58] Field of Search .......................... 364/200 MS File

[56] References Cited

U.S. PATENT DOCUMENTS 4,024,508  5/1977  Bachman et al. ..................... 364/200
4,041,462  8/1977  Davis et al. .......................... 364/200

Primary Examiner—Raulfe B. Zache
Attorney, Agent, or Firm—Frailey & Ratner

[57] ABSTRACT

A computer system having a "program call instruction" which enables the use of a common program in a plurality of main program systems. The program call instruction has a pair of address parts (A) and (B), the first address part (A) is transferred to the program counter which indicates the current excuted program address and the second address part is transferred to the second push down stack. Before excuting the program call instruction the content of the program counter is transferred to the first push down stack. In excuting the common program, the content of the program counter and the output of the second push down stack are compared and when they coincide the output of the first push down stack is transferred to the program counter to return to a main program.

4 Claims, 7 Drawing Figures

SYSTEM FOR EXCUTING A PROGRAM-CALL INSTRUCTION IN A COMPUTER

BACKGROUND OF THE INVENTION

The present invention relates to a system for excuting an instruction in a digital computer, in particular, relates to a system for excuting "program call" instruction in a digital computer. The program call instruction is a novel instruction and facilitates the use of a program commonly in a plurality of program systems.

In a prior computer system, when a particular program is commonly used in a plurality of program systems, a particular software technique such as an open subroutine or a closed subroutin has been utilized.

In a closed subroutine system, any subroutine program must have a particular program step at the end of the subroutine for returning to a main program system.

And in an open subroutine system, a copy of a whole subroutine is transferred to another portion in a memory, so a large amount of memory area is necessary and further the coupling procedure of the copy program is necessary.

Accordingly, a prior sub-routine program which is to be commonly used in a plurality of main program systems must be designed as a sub-routine program having a particular program format, but an ordinary program which does not have a particular format, for instance, a return instruction at the end of the program, can not be commonly utilized.

A recent micro-processor or a micro-computer having a read-only memory has a plurality of programs in said read-only memory. However, those programs are not designed to be used in other program systems, so they of course do not have a return instruction.

As apparent from the above explanation, the disadvantage of the prior art is that a ready-made program which is not designed to be utilized as a sub-routine can not be used in other programs.

SUMMARY OF THE INVENTION

It is an object, therefore, of the present invention to overcome the disadvantages and limitations of a prior computer system by providing a new and improved computer system.

It is also an object of the present invention to provide a computer system having a "program call" instruction.

The above and other objects are attained by a system for excuting a program-call instruction in a computer system comprising, a first push down stack for storing the next address of the address storing the program call instruction, a second push down stack for storing the final address of the common program, a program counter for indicating the current excuted address, and a comparator for comparing the content of said program counter and the output of said second push down stack. The content of the program counter is, switched from a main program address to the common program address, and after completion of the common program the same is switched again from the common program address to the main program address.

BRIEF DESCRIPTION OF THE DRAWINGS

The foregoing and other objects, features, and attendant advantages of the present invention will be appreciated as the same become better understood by means of the following description and accompanying drawings wherein.

DETAINLED DESCRIPTION OF THE PREFERRED EMBODIMENTS

First, a prior sub-routine system will be explained in accordance with FIGS. 1 through 3 for the easy understanding of the present invention.

Figure 1:
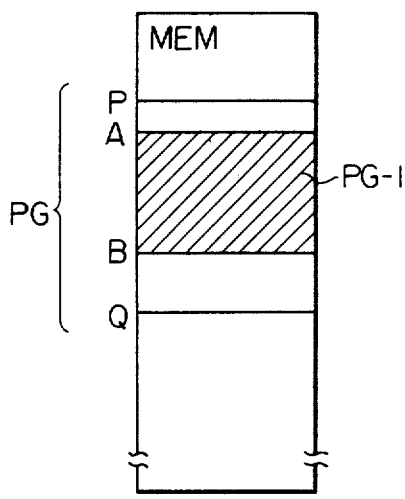
FIG. 1 shows an example of a memory map in a computer system.

FIG. 1 shows a general view of a memory map showing a memory MEM having a program PG with the start address P and the end address Q. The program PG has a common program PG-1 with the start address A and the end address B. A common program PG-1 may be a closed sub-routine type shown in FIG. 2 or an open sub-routine type shown in FIG. 3.

Figure 2:
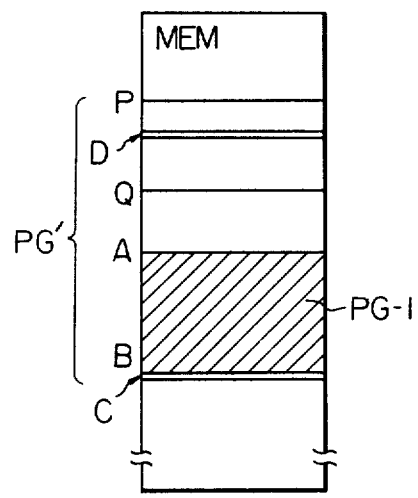
FIG. 2 and FIG. 3 show an explanatory view of a memory map in the prior arts.

In a closed sub-routine shown in FIG. 2, the main program with the start address P and the end address Q is supposed to use the common program or the sub-routine PG-1. In this situation, the sub-routine PG-1 must have the return instruction at the end of the sub-routine, otherwise, the particular return instruction C must be attached at the end of the sub-routine PG-1. Said return instruction C may be an "Unconditional Jump to a designated address". Further, the main program must have the particular instruction D for calling the sub-routine PG-1. Said instruction D may be an "Unconditional Jump to the address A". Accordingly, the program PG in FIG. 1 must be changed to the program PG' in FIG. 2 by attaching the inevitable instructions C and D. Therefore, when the sub-routine PG-1 is ready-made mounted in a read-only memory, said sub-routine can not be commonly used since the attachment of the instructions C and D in a read-only memory is almost impossible.

Figure 3:
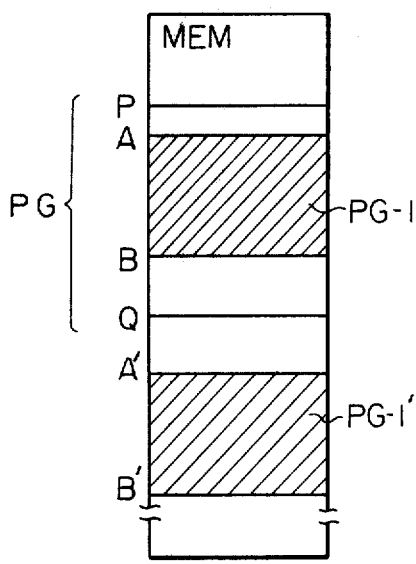

In an open-sub-routine system shown in FIG. 3, the common program PG-1 with the start address A and the end address B is transferred to another portion with the start address A' and the end address B'. Therefore, the coupling procedure of the programs PG and PG-1' is necessary, and further the transferred program occupies the memory area. Thus, when the common program PG-1 is a large program occupying a large amount of memory area or said common program is used frequently in the main program, the lack of memory capacity might make it impossible to use the common program.

The above problem can not be solved by conventional hardware structure.

The present invention mitigates the above problem and makes it possible to use a ready-made program commonly without attaching a return instruction or occupying a large amount of memory area.

Figure 4:
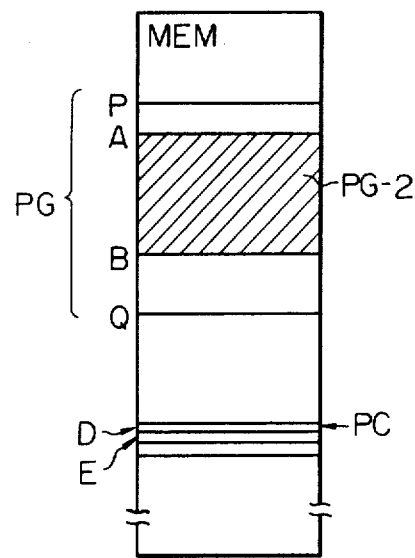
FIG. 4 shows the structure of the programs in a memory according to the present invention.

FIG. 4 shows the structure of the programs in a memory according to the present invention.

The main program PG with the start address P and the end address Q has the common use program PG-2 with the start address A and the end address B. Said common use program PG-2 is supposed not to have a return instruction. When an outside program intends to use the common use program PG-2 said outside program excutes a "program call" instruction PC stored at the address D. The program call instruction PC is programed

PROGRAM CALL A TO B.

Said program call instruction thus programed excutes the program from the address A to the address B. Therefore, the common use program PG-2 is excuted by the program call instruction PC. After the program call instruction PC is finished, that is to say, the program from the address A to the address B is finished, the program located at the address E which is the next address of the address D is excuted in the usual manner.

Figure 5:
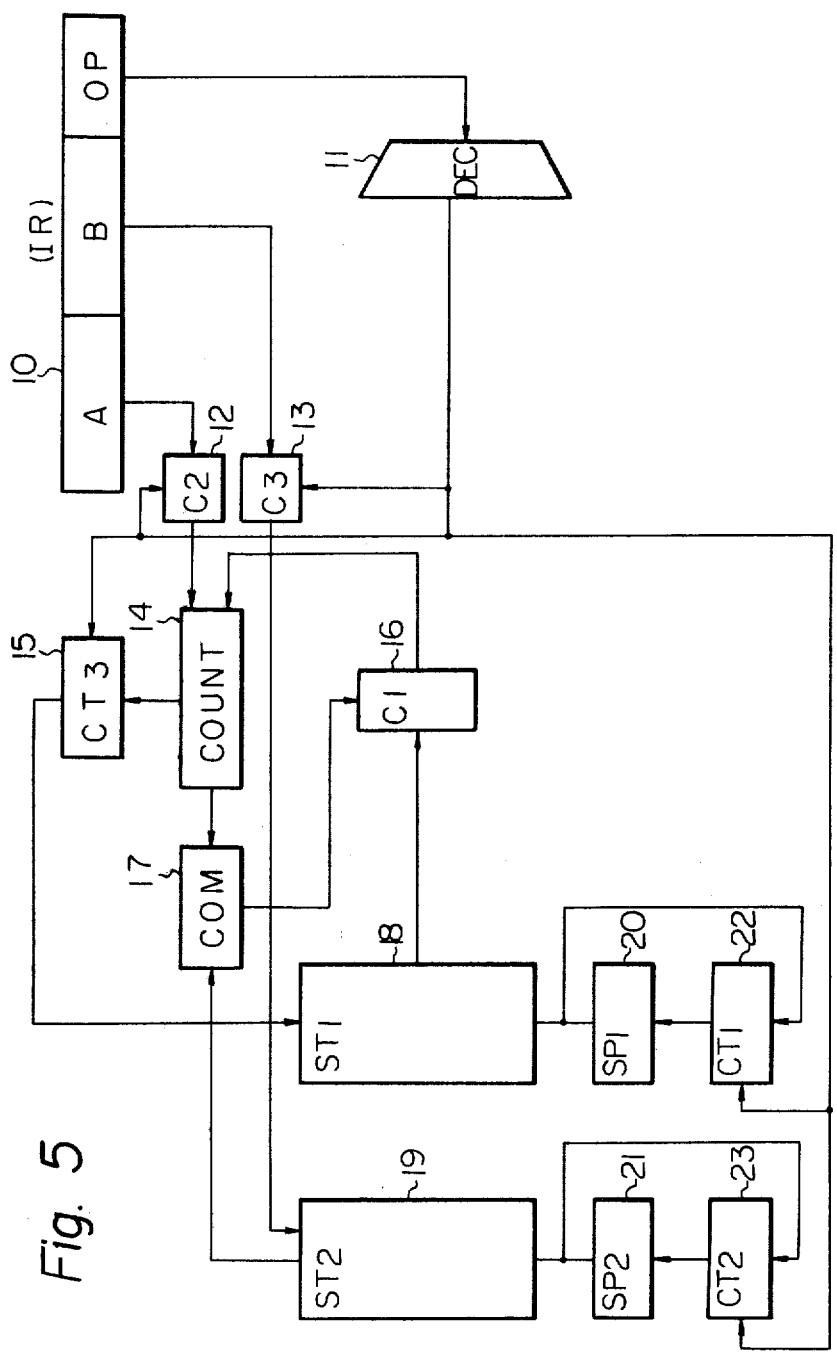
FIG. 5 is a block-diagram of the hardware for excuting a "program call" instruction according to the present invention.
Figure 6:
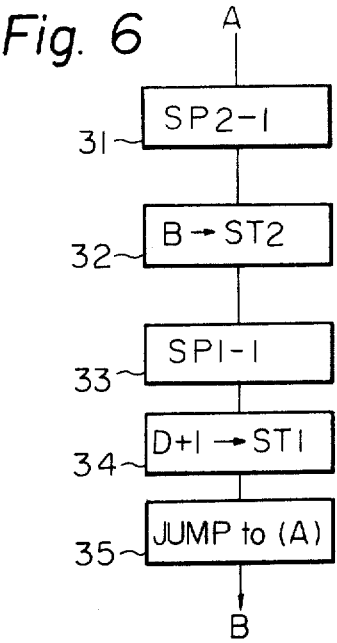
FIG. 6 is a flow-chart showing the operation of a "program call" instruction according to the present invention.
Figure 7:
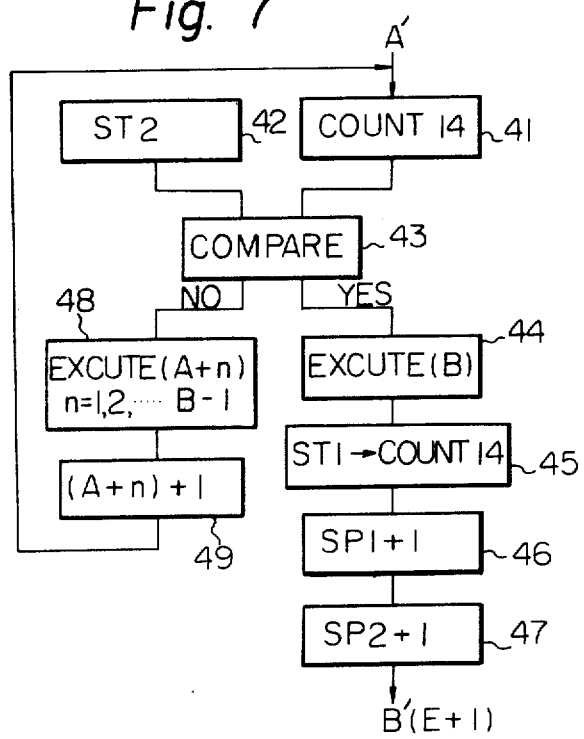
FIG. 7 is a flow chart showing the operation of the program excuted by the present "program call" instruction.

FIG. 5 shows the block-diagram of the hardware of a computer system for excuting the program-call instruction according to the present invention, and FIGS. 6 and 7 show flow diagrams showing the operation of the apparatus in FIG. 5.

In FIG. 5, the reference numeral 10 is an instruction register IR storing the instruction which is now excuted, and is of course connected to a memory (not shown). The instruction register 10 has three portions, an operation part OP, a first address part A and a second address part B. The code stored in the operation part OP designates the operation of an instruction; in the present embodiment, the program call instruction is designated. The decoder DEC 11 decodes the operation part and provides the necessary output signals for excuting the decoded instruction. The first address part A designates the start address A of a common program, and the second address part B designates the end address B of a common program. The reference numeral 12 is a gate circuit C2, which passes the content of the part A to the counter 14 when the decoder 11 decodes the program call instruction, and the reference numeral 13 is the other gate circuit C3, which passes the content of the part B to the stack ST-2 19 when the decoder 11 decodes the program call instruction. The stack ST1 18 stors the address E, which is located next to the address D staring the "program call" instruction PC, and the content of the stack ST1 indicates the return address from a common program in this embodiment, PG-2 to a main program. The stack pointer SP1 20 indicates the address of the stack ST1 to be read, and the content of the stack pointer SP1 20 is given by the counter CT1 22, the content of which is added or subtracted by one each time the program call instruction is decoded or the stack ST1 18 is read. The other stack ST2 19 stores the address B, which is the end address of a common program PG-2 in this embodiment, and the stack pointer SP2 21 indicates the address of the stack ST2 to be read. The content of the stack pointer SP2 21 is given by the counter CT2 23, the content of which is added or subtracted by one each time the program call instruction is decoded or the stack ST2 is read. It should be appreciated that the stacks 18 and 19 are push-down memories or first-in-last-out memories, in which the input data is stored in a stack in the sequence the data is applied to a stack, and when a stack is read the last stored data is read out. The stack pointers 20 and 21, and the counters 22 and 23 are provided in order to operate a memory as a first-in-last-out stack.

The reason that the stacks are utilized instead of just a pair of registers is to allow a common program to use a further common program in the former common program. The program counter COUNT 14 is a register the content of which shows the address at which the current excuted instruction is stored in a main memory. The comparator COM 17 compares the address B stored in the stack ST2 19 with the content of the program counter COUNT 14, and provides the output signal when they coincide. The counter CT3 15 functions to generate a number (the content of the COUNT plus one) and stores the same in the stack ST2 18 at the address designated by the stack pointer SP1 20. The reference numeral 16 is a transfer circuit which functions to transfer the read-out data from the stack ST1 20 at the address designated by the stack pointer SP1 to the program counter COUNT 14, according to the output of the comparator COM 17.

Now, the operation of the apparatus in FIG. 5 is explained in accordance with FIG. 6 and FIG. 7.

FIG. 6 shows the flow-chart showing the operation of the program call instruction PC.

When the program call instruction PC at the address D is decoded, the content of the stack pointer SP2 21 is subtracted by one (see 31 in FIG. 6), and the address B at the second address part B of the instruction register IR 10 is transferred to the stack ST2 19 through the gate circuit C3 13 and said address B is stored in the stack ST2 19 at the address designated by the stack pointer SP2 21 (see 32 in FIG. 6). On the other hand, the stack pointer SP1 20 is also subtracted by one (see 33 in FIG. 6), and the address E which is equal to (D + 1) indicating the next address of the address of the program call instruction PC is transferred to the stack ST1 18 from the program counter COUNT 14 through the counter CT3 15. Said address E is stored in the stack ST1 18 at the address designated by the stack pointer SP1 20 (see 34 in FIG. 6). Next, the address A at the first address part A of the instruction register IR 10 is transferred to the program counter COUNT 14 through the gate circuit C2 12, thus the program excution jumps to the address A (see 35 in FIG. 6). Then, the common program stored from the address A is excuted. It should be noted the content of the program counter COUNT 14 is increased one by one each time a program instruction is excuted.

FIG. 7 shows the flow chart showing the operation of a common program.

During the excution of a common program, the comparator COM 17 compares the content of the stack ST2 19 whose address is indicated by the stack pointer SP2 21, with the content of the program counter COUNT 14 (see 41, 42 and 43 in FIG. 7). When the former is not equal to the latter, the excution of a common program is continued. That is to say, the program instruction at the address (A + n), which is of course within the common program is excuted (see 48 in FIG. 7), and the content of the program counter COUNT 14 is added by one (see 49 in FIG. 7). A common program is excuted by repeating the above cycle 41, 42, 43, 48 and 49 in FIG. 7 until the program counter COUNT 14 reaches the number B.

When the common program comes to the address B, said comparator COM 17 provides the output signal indicating the content of the stack ST2 is equal to the content of the program counter COUNT 14 (see 43 in FIG. 7). Then, the last instruction of the common program stored at the address B is excuted (see 44 in FIG. 7), and the content of the stack ST1 18 which is equal to ($E=D+1$) is transferred to the program counter COUNT 14 through the transfer circuit C1 16. Thus, the excution of the program returns to the address ($E=D+1$) in the main program. And finally, the stack pointers SP1 20 and SP2 21 are added by one (see 46 and 47 in FIG. 7), then the content of the stack pointers returns to the initial value before the common program is excuted.

It should be appreciated that the common program PG-2 can further use other common programs PG-3, PG-4, etc., with the same procedure as explained above. In those cases, the stack ST1 18 stores the return address in the first common program PG-1 which corresponds to the address E in FIG. 4, and the stack ST2 19 stores the final address of the second or third common program PG-3 or PG-4.

As explained above in detail, the present invention can provide the use of a common program which is not designed in a sub-routine format, without any change of the common program and without the transfer of the common program to a new memory area, by attaching a small amount of hardware to a conventional computer hardware.

From the foregoing, it will now be apparent that a new and improved computer system has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A computer system for excuting a program call instruction which facilitates the common use of a common program in a plurality of main programs comprising a first push down stack for storing the next address of the address of the program call instruction, a second push down stack for storing the final address of the common program, a program counter for indicating the current excuted address, being switched to the start address of the common program upon decoding the program call instruction, a comparator for comparing the output of the second push down stack and the content of the program counter, and means for transferring the output of the first push down stack to said program counter according to the output of said comparator.

2. The invention as defined in claim 1, wherein each of said first and second push down stacks has an addressable memory and a stack pointer which indicates the address to be accessed of said addressable memory.

3. The invention as defined in claim 1, wherein said computer system further comprises an instruction register for storing a current excuted instruction, having three portions (operation part, a first address part, and a second address part), and in excuting the program call instruction, by decoding the operation part, the content of the first address part is transferred to the program counter and the content of the second address part is transferred to the second push down stack.

4. The invention as defined in claim 1, wherein said computer system further comprises means for transferring the value which is equal to the content of the program counter plus one to said first push down stack.

* * * * *